May 19, 1959 W. H. EBURN, JR 2,887,028
CAMERA SHUTTER
Filed April 19, 1957 4 Sheets-Sheet 1

INVENTOR.
William H. Eburn, Jr.
BY
Brown and Mikulka
and
Robert E. Corb
ATTORNEYS May 19, 1959  W. H. EBURN, JR  2,887,028
CAMERA SHUTTER
Filed April 19, 1957  4 Sheets-Sheet 2

INVENTOR
William H. Eburn, Jr.
BY
Brown and Mikulka
and
Robert E. Corb
ATTORNEYS

United States Patent Office 2,887,028
Patented May 19, 1959

2,887,028

CAMERA SHUTTER

William H. Eburn, Jr., Abington, Mass., assignor to Polaroid Corporation, Cambridge, Mass., a corporation of Delaware Application April 19, 1957, Serial No. 653,987

14 Claims. (Cl. 95—64)

This invention relates to novel improvements in camera shutter mechanisms.

In the copending application of Sidney B. Whittier, Serial No. 388,641, filed October 27, 1953, for example, there is disclosed a novel shutter mechanism of the type well known in the art comprising a housing including an exposure aperture, an aperture-covering element or blade mounted for rotation on the housing, means for retaining the blade in aperture-covering position, and means for applying a sharp impact to the blade to impart an aperture-uncovering movement thereto. A plurality of rebound members are positioned in the path of rotation of the blade, each capable of engaging the blade and reversing its direction of movement so as to return it to aperture-covering position. The speed of the shutter or the length of the time during which the aperture is uncovered by the blade is a function of the angle of rotary movement of the blade and is controlled by the position of the rebound member which returns the blade to aperture-covering position. The rebound members are located at different positions in the arcuate path of movement of at least a portion of the blade and the shutter includes means for moving the rebound members into and from this arcuate path whereby variations are made in the shutter speed, depending on which rebound member is in position to engage the blade.

Shutters of the type disclosed in the aforementioned application have included as a diaphragm means, a circular diaphragm disk having a plurality of apertures and mounted for rotation so that the apertures can be moved into alignment with the exposure aperture. The diaphragm disk is coupled with the rebound members whereby rotation of the diaphragm disk is effective to predeterminedly vary the speed of the shutter and, by virtue of this arrangement, the diaphragm disk may be rotated to give any of a plurality of predetermined exposure settings comprising correlated apertures and shutter speeds. The shutter includes a single speed and aperture control for rotating the diaphragm disk.

An object of the invention is to provide a shutter of the foregoing type wherein the indicia, designating a plurality of correlated diaphragm and shutter settings, are visibly displayed on the outside of the shutter housing together with a single control element, the position of which may be moved manually through a relatively small distance for directly adjusting the control element to coincide with any of the desired indicia.

Other objects of the invention are: to provide a shutter mechanism of the foregoing type characterized by its compactness and including, as a diaphragm, a pair of pivotable sector-shaped disks having a plurality of apertures and movable together and independently of one another for providing a plurality of aperture stops; to provide, in a shutter as described, manually operable means for controlling the positions of the sector-shaped diaphragm disks and coupled with at least one of the rebound members for moving said member into and from blade-engaging position; and to provide a shutter as described especially constructed to guard against leakage of light.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figures 1, 2:
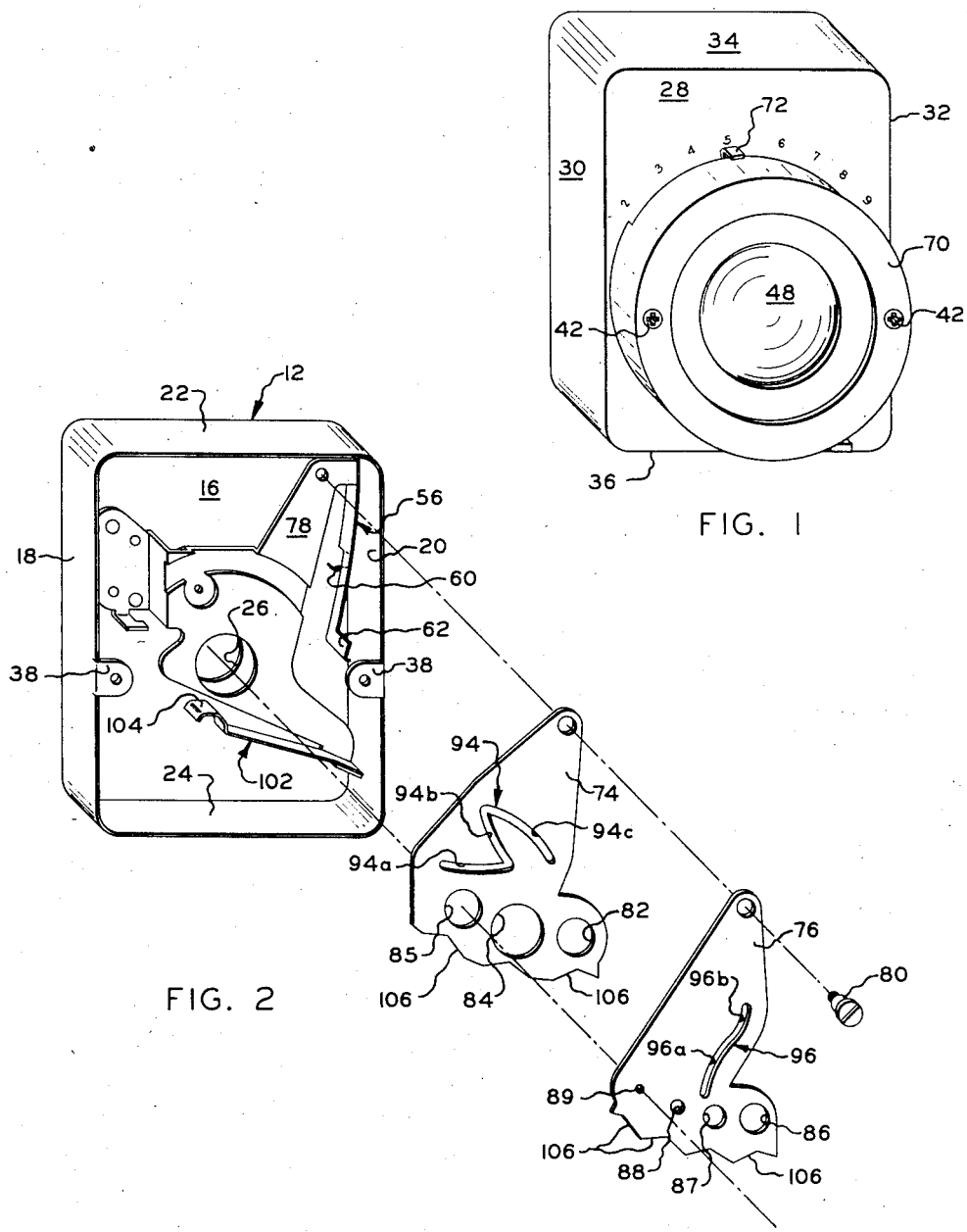
Figure 1 is a front perspective view of a shutter embodying the present invention.
Figs. 2 and 3 are exploded perspective views of components of the shutter of Fig. 1.
Figure 3:
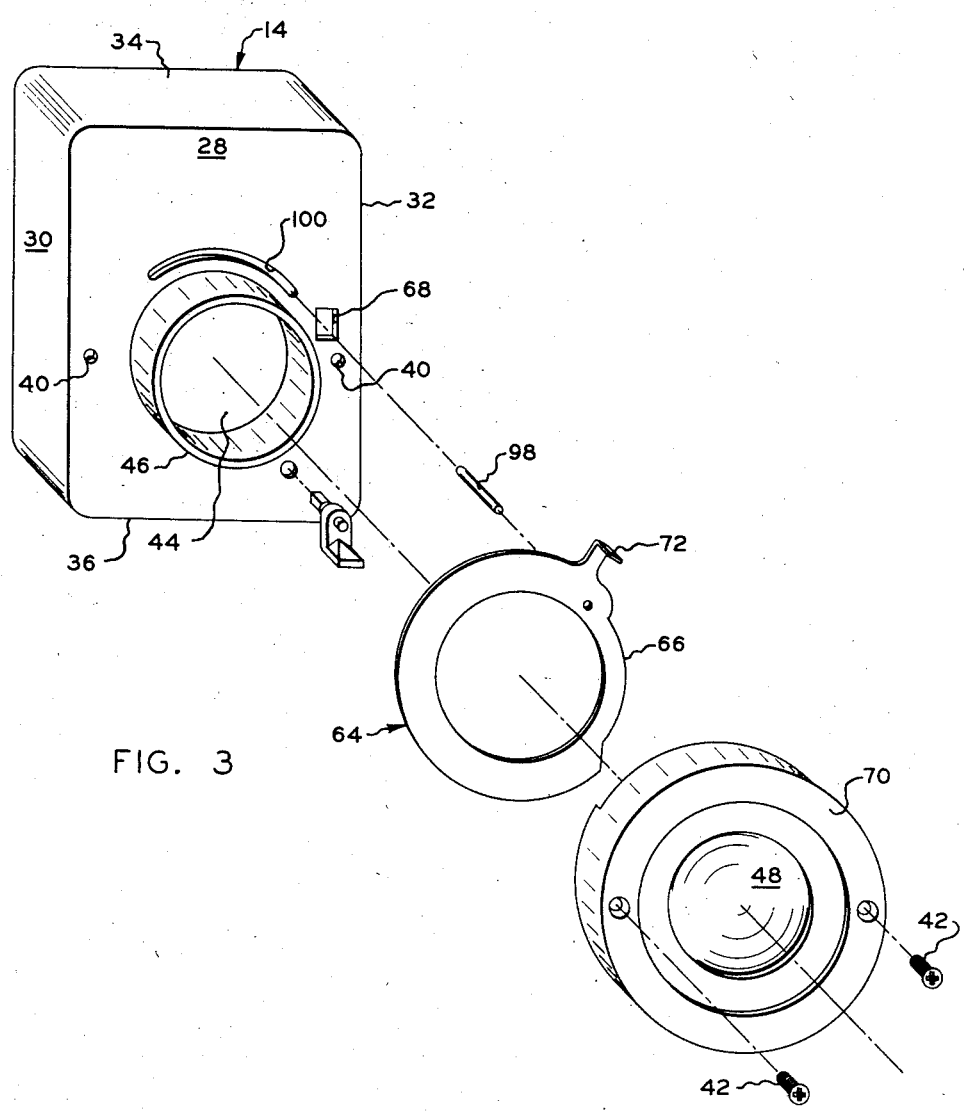

The shutter of the invention is of the same general type disclosed in the aforementioned patent application and comprises a housing or casing having a rear section 12 and a forward section 14 for mounting and enclosing a lens and the various elements comprising the shutter mechanism. Rear casing 12 includes a rear wall 16, forwardly projecting side walls 18 and 20, upper wall 22 and lower wall 24. An exposure aperture 26 is provided in rear wall 16, the wall which is located closest the film plane of the camera, with which the shutter is associated. Forward casing section 14 comprises a forward wall 28 generally coextensive with rear wall 16 and rearwardly projecting side walls 30 and 32, upper wall 34 and lower wall 36, the rearwardly projecting walls being adapted to extend outside of side walls 18 and 20, upper wall 22 and lower wall 24 when the two casing sections are assembled together. A pair of inwardly projecting brackets 38 are provided on side walls 18 and 20 and include holes which may be threaded, coincident with holes 40 in forward wall 28, whereby suitable retaining means such as bolts or screws 42 may be employed for fastening the two sections together. An exposure aperture 44 is provided in forward wall 28 along with a cylindrical collar 46 surrounding aperture 44 mounting a lens 48.

The shutter mechanism comprises a blade 50 mounted for rotation on rear wall 16 and normally positioned with a portion thereof covering exposure aperture 26. To make an exposure, an aperture-uncovering movement is imparted to the blade by mechanism for delivering a sharp impact to the blade when it is in aperture-uncovering position. The mechanism of the shutter, including the means for normally retaining blade 50 in aperture-covering position and means for delivering an impact to the blade to free it from the holding means and imparting an aperture-uncovering movement to the blade, is of substantially the same construction as is the mechanism shown in the aforementioned application. Blade 50 is provided with a lug 52 at one end adapted to be engaged by an impulse member 53 for delivering an impact to the blade and a rebound member for reversing the direction of rotation of the blade. Impulse member 53 comprises an element of the above-mentioned mechanism which also includes an actuating member 55 projecting from the shutter housing and being manually operable for setting and tripping the shutter.

The shutter, in the form shown, comprises two rebound members, designated 54 and 56, for reversing the direction of rotation of the blade and providing two different shutter speeds. Rebound member 54 comprises a generally L-shaped resilient member or spring secured to upper wall 22 and having a blade-engagement portion 58 which projects downward into the arcuate path of movement of lug 52. The angle of travel of lug 52 between the aperture-covering position of the blade and blade-engagement portion 58 of member 54 is the measure of the exposure speed or duration of exposure produced by the shutter. Rebound member 56 is mounted adjacent one end on side wall 20 and extends downward toward lower wall 24. Member 56 includes a blade-engagement portion 60 which normally projects into the arcuate path of movement of lug 52 at a position on said path intermediate blade-engagement portion 58 of member 54 and the position of the lug when the blade is in aperture-covering position, blade-engagement portion 60 being closer, along the arcuate path of movement of the lug, to the aperture-covering position of the lug than is blade-engagement portion 58, and results in a shorter exposure (faster speed) than when blade-engagement portion 60 reverses the direction of rotation of the blade.

Means are provided for moving blade-engagement portion 60 of member 56 out of the path of movement of lug 52 so that the blade will rotate (in a counterclockwise direction viewing Figs. 4 and 5) until it strikes blade-engagement portion 58, thereby giving a longer exposure. These means comprise a forwardly projecting lug 62 on the free or lower end of rebound member 56 and a control ring 64 mounted against the forward surface of wall 28 and engaged for rotation around collar 46. Ring 64 is generally circular and includes an arcuate edge section 66 of lesser diameter. Lug 62 projects through an opening 68 in forward wall 28 into engagement with the outer edge of ring 64 which functions as a cam for moving rebound member 56. The shape of ring 64 is such that blade-engagement portion 60 of rebound member 56 is normally located in the path of movement of lug 52 when lug 62 is in coaction with section 66 of the control ring. As the ring is rotated it functions as a cam for coacting with lug 62 and displacing the lug away from the center of rotation of the blade so as to move blade-engagement portion 60 out of the arcuate path of movement of lug 52.

The shutter includes a cover ring 70 secured in covering relation to a control ring 64 for retaining the control ring against forward wall 28 and for covering opening 68 in the forward wall so as to prevent light from entering the shutter housing. Cover ring 70 is secured in fixed position by such means as screws 42 and may be provided with suitable indicia designating positions at which an indicator arm 72 on control ring 64 may be set for setting the shutter mechanism for predetermined correlated exposure speeds and apertures. Indicator arm 72 extends forward from ring 64 and is manually engageable for rotating the ring for selecting the speed and aperture at which exposure is to be made by the shutter.

The diaphragm means of the shutter comprises a pair of substantially flat diaphragm blades 74 and 76 having a plurality of diaphragm apertures of predetermined diameter formed therein. Diaphragm blades 74 and 76 are each shaped generally in the form of a sector and are mounted coaxially with one another adjacent their narrow ends for pivotal movement independently of one another about an axis normal to the planes of the blades. The blades are arranged with their adjacent surfaces in parallel relation and closely adjacent or in face-to-face contact. A support member 78 is provided in the shutter housing mounted on rear wall 16 for mounting and supporting many of the components of the shutter mechanism, including diaphragm blades 74 and 76 which are pivoted about a stud 80 secured in support member 78 adjacent the intersection of side wall 20 and upper wall 22 with the blades extending downward across exposure aperture 26.

Diaphragm blade 74 is located behind blade 76 and includes three apertures (from right to left viewing Figs. 2, 4 and 5), designated 82, 84 and 85, while blade 76 includes four diaphragm apertures, designated from right to left 86, 87, 88 and 89. The centers of the diaphragm apertures are located in their respective blades on an arc having a center at the axis of stud 80 on which the blades are pivoted and a radius equal in length to the distance between the axis of the stud and the center of exposure aperture 26 whereby the blades may be pivoted for moving any of the diaphragm apertures into coincidence with exposure aperture 26 and lens 48.

The shutter, in the form shown in the drawings, offers a selection of eight different exposure settings comprising correlated aperture and speed settings made possible by seven apertures and two different speeds, all determined by rotating control ring 64. These eight exposure settings, hereinafter arbitrarily designated by the numerals 2 through 9, range from the largest aperture and slower speed to the smallest aperture and faster speed, and are selected by turning control ring 64. Forward wall 28 or cover ring 70 is provided with suitable indicia, such as the numerals 2 through 9 (see Fig. 1), designating the positions at which arm 72 is located for any particular exposure setting. For exposure settings or conditions designated by the numerals 2 and 3, diaphragm apertures 84 and 82, respectively, are located in alignment with exposure aperture 26 while rebound member 56 is located out of the path of movement of lug 52 whereby the shutter will give the slowest speed, i. e., the longest exposure. For exposures 4 through 9, rebound member 56 is located so as to engage the lug on blade 50 and produce the faster speed, i. e., the shorter exposure. Blade 74 is pivoted so as to locate aperture 84 in alignment with the exposure aperture for exposure No. 4 and diaphragm aperture 85 is located in alignment with the exposure aperture for the exposure settings numbered 5 through 9. Exposure settings 6 through 9 are achieved by locating diaphragm apertures 86, 87, 88 and 89, respectively, in alignment with exposure aperture 26.

Variations in the positions of blades 74 and 76 relative to exposure aperture 26 are achieved by providing the blades with cam slots, designated 94 and 96 respectively, and providing control ring 64 with a cam-engagement member or pin 98 which projects through an arcuate slot 100 in forward wall 28 into cam slots 94 and 96. Cam slot 94 is generally zigzag in shape, having three curved sections, designated 94a, 94b and 94c, adapted to engage pin 98 during clockwise arcuate movement of the pin for pivoting diaphragm blade 74 in a clockwise direction from a position (shown in Fig. 5) wherein the shutter is set to give exposure No. 2, i.e., with diaphragm aperture 84 located in alignment with exposure aperture 26, to a position wherein aperture 82 is located in alignment with exposure aperture 26 (exposure setting No. 3); and thence in a counterclockwise direction for locating diaphragm apertures 84 and then 85 in alignment with the exposure aperture for exposure settings Nos. 4 and 5 through 9. In pivoting blade 74 from its position for exposure setting 2 to its position for exposure setting 3, pin 98 moves in slot section 94a from the position shown in Fig. 5, at the left end of slot section 94a, to the right end of slot section 94a and the inner section therewith of slot section 94b. The pin is then moved in engagement with slot section 94b, pivoting blade 74 in a counterclockwise direction from its position for exposure setting 3, through its position for exposure setting 4 wherein the pin is located intermediate the ends of slot section 94b, to a position for exposure setting 5 wherein the pin is engaged at the end of slot section 94b at the intersection of slot section 94c. The pin is engaged in slot section 94c throughout settings 5 through 9, slot section 94c being in the form of an arc having a center at the center of diaphragm aperture 85 (and exposure aperture 26) so that section 94c functions as a dwell, allowing the pin to move in an arc without affecting the position of blade 74 during pivotal movement of blade 76 through a series of four positions corresponding to exposure settings numbered 6 through 9.

Figure 5:
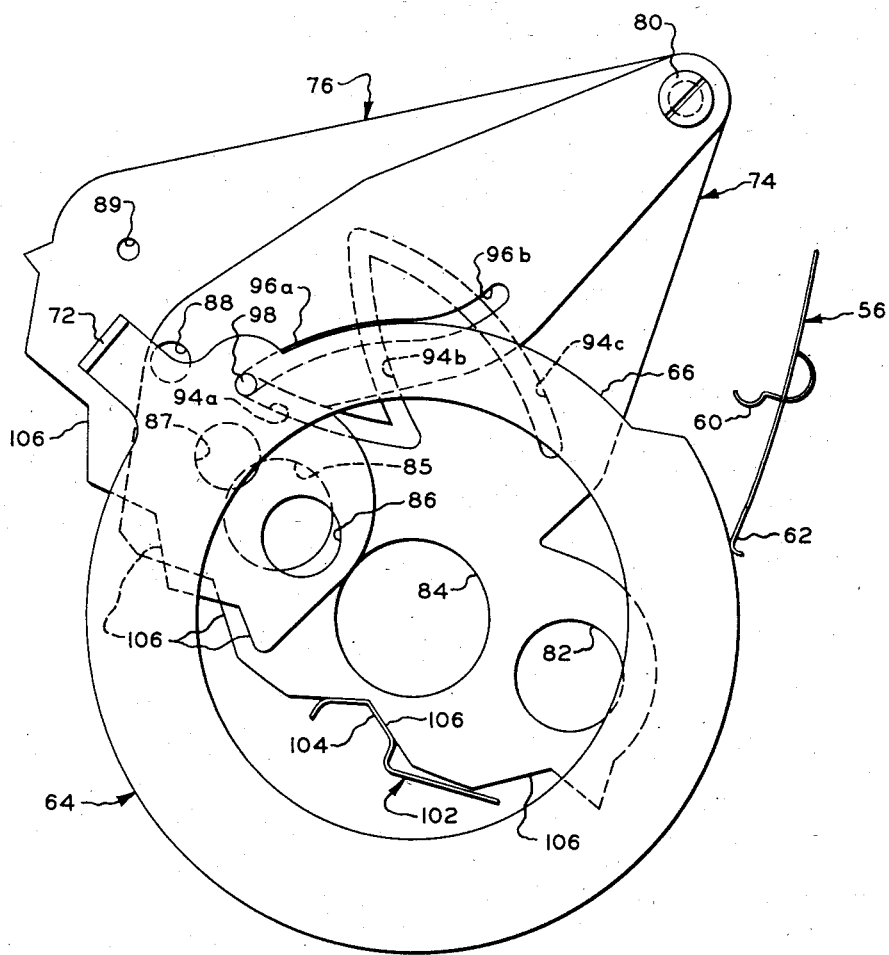
Fig. 5 is a view, similar to Fig. 4, showing elements of the shutter mechanism in another operative position.

Cam slot 96 in blade 76 includes two curved sections, designated 96a and 96b. Section 96a is in the form of an arc, having at its center the center of exposure aperture 26 when blade 76 is located in a position to the left of aperture 26, as shown in Fig. 5, at exposure settings numbered 2 through 5 of the shutter. Thus, pin 98 is free to move in section 96a of cam slot 96 without affecting the position of blade 76 through any of exposure settings 2 through 5. Section 96b of cam slot 96 is shaped so as to be engaged by pin 98 during clockwise movement of the pin for moving diaphragm apertures 86, 87, 88 and 89 into alignment with exposure aperture 26 as the shutter is set, respectively, for exposures numbered 6, 7, 8 and 9.

Figure 4:
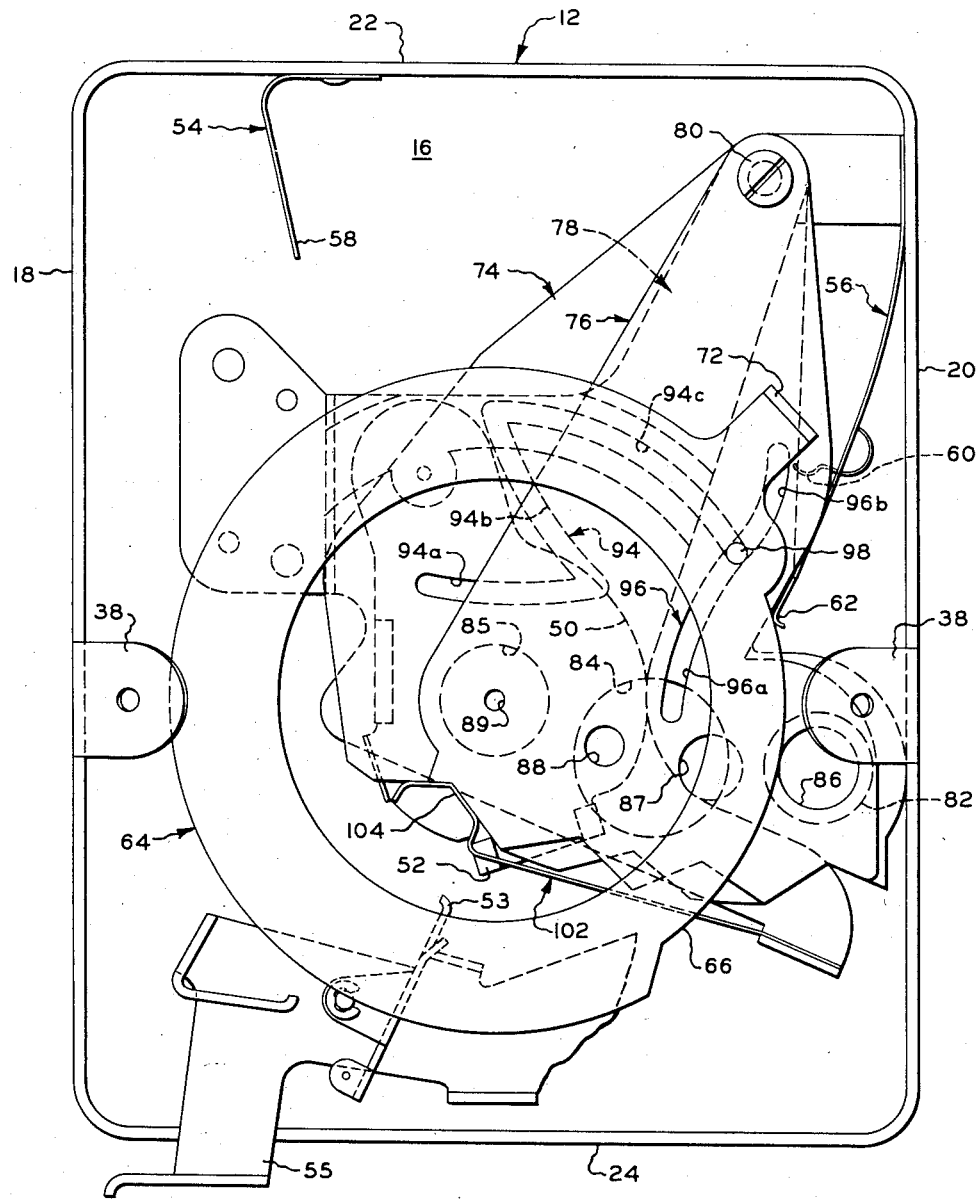
Fig. 4 is a front elevational view of the shutter of Fig. 1 shown with the front portion of the shutter housing and components thereof removed.

It will be noted that, in the position shown in Fig. 4 wherein diaphragm blade 74 is located in position for exposure settings 5 through 9, one side of the diaphragm is located against side wall 20 of the shutter housing which functions as a stop for positioning the diaphram. Side wall 20 also functions as a stop for positioning diaphragm blade 76 with diaphragm aperture 89 located in alignment with the exposure aperture at exposure setting 9 of the shutter (also shown in Fig. 4). Detent means are provided for releasably retaining the diaphragm blades in their proper positions for each of the other exposure settings of the shutter. This detent means comprises a resilient arm 102 secured at one end to the shutter housing and having a blade-engagement member 104 on its free end. Blades 74 and 76 are provided with a series of notches 106 in their lower edges adapted to be engaged by blade-engagement member 104 for accurately locating and retaining the blades in positions with the diaphragm apertures therein located in alignment wtih the exposure aperture and lens of the shutter.

At the position of control ring 64 for exposure settings 2 and 3, lug 62 on rebound member 56 engages the edge of ring 64 in the area of its larger diameter and, as ring 64 is moved from setting No. 3 to setting No. 4, lug 62 moves into engagement with arcuate section 66 of the ring, allowing rebound member 56 to pivot (in a clockwise direction viewing Figs. 4 and 5) so that blade-engagement portion 60 is located in the path of movement of lug 52 on blade 50. In this way the speed of the shutter is increased as ring 64 is pivoted for changing the diaphragm setting, both the shutter speed and diaphragm aperture being controlled by the same member.

It is readily apparent that a shutter mechanism of the type with which the present invention is concerned, and including three or more rebound members for providing three or more shutter speeds, could be modified to incorporate the control means of the invention. Two or more of the rebound members would then be movable out of blade-engagement position and be provided with cam-engagement members adapted to coact with the control ring which, in turn, would be formed so as to displace the rebound members when desired. A shutter of this type is not limited to any particular number of diaphragm apertures or to only two diaphragm blades, and could be provided with three or more diaphragm blades each having a cam slot and providing one or more diaphragm apertures.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera shutter comprising means providing an exposure aperture, a movable shutter blade normally located in position covering said aperture, means for imparting an aperture-uncovering movement to said shutter blade and rebound means located in the path of aperture-uncovering movement of said blade for returning said blade to aperture-covering position, the combination, in said shutter, of diaphragm means providing a plurality of diaphragm apertures and control means coupled with said diaphragm means and said rebound means for varying both the diaphragm aperture and the exposure speed of said shutter, said rebound means comprising at least a pair of rebound members positioned in the path of aperture-uncovering movement of said blade for engaging said blade and reversing its direction of movement, at least one of said rebound members being located at a position in said path of said blade at a location less remote from the aperture-covering position of said blade than the other of said rebound members, said one rebound member being movable from said path of movement of said blade, said diaphragm means comprising at least a pair of diaphragm elements each having at least one diaphragm aperture therein and being mounted for movement in overlying relation relative to one another and said exposure aperture, said diaphragm elements being movable to a plurality of correlated positions including at least one position wherein a diaphragm aperture in one of said elements is alone the controlling aperture for said shutter and another position wherein a diaphragm aperture in the other of said elements is alone the controlling aperture for said shutter, said control means comprising a manually engageable control member coupled with said one rebound member for moving said one rebound member out of said path of movement of said shutter blade and coupled with said diaphragm elements for moving said elements into at least the aforementioned positions.

2. In a camera shutter comprising casing means having an exposure aperture, a shutter blade mounted for rotation in said casing and normally located in position covering said exposure aperture, means for imparting an aperture-uncovering movement to said blade and at least a pair of rebound members positioned in the path of aperture-uncovering movement of said blade for engaging said blade and reversing its direction of movement, the combination, in said shutter, of diaphragm means providing a plurality of diaphragm apertures and control means coupled with said diaphragm means and at least one of said rebound members for varying both the diaphragm aperture and the exposure speed of said shutter, at least one of said pair of rebound members being located in position in said path of movement of said blade for engagement with said blade at a location less remote from the aperture-covering position of said blade than the other of said rebound members, said one rebound member being movable from blade-engagement position in said path of movement of said blade, said diaphragm means comprising at least a pair of generally flat diaphragm blades each having a plurality of diaphragm apertures formed therein, said diaphragm blades being mounted in closely adjacent overlying relation for movement with respect to one another and said exposure aperture to a plurality of correlated positions including at least a first position wherein a diaphragm aperture in one of said elements is in alignment with said exposure aperture and alone comprises the controlling aperture of said shutter and a second position wherein a diaphragm aperture in the other of said elements is in alignment with said exposure aperture and alone comprises the controlling aperture of said shutter, said control means comprising a manually engageable control member mounted on the exterior of said casing and coupled with said one rebound member for moving said one rebound member out of blade-engagement position in said path of movement of said shutter blade and coupled with said diaphragm blades for moving said blades into at least said first and second positions.

3. A shutter as defined in claim 2 wherein said control member comprises a ring mounted for rotation on the exterior of said casing in surrounding relation to said exposure aperture.

4. A shutter as defined in claim 3 wherein said one rebound member includes an engagement member projecting from said casing and said control ring includes an edge section comprising a cam for coacting with said engagement member for varying the position of said one rebound member in response to rotation of said control ring.

5. A shutter as defined in claim 2 wherein each of said diaphragm blades includes a cam slot and said control member includes an engagement member projecting into said cam slots for coacting with said cam slots so as to vary the positions of said diaphragm blades in response to motion of said control member.

6. A shutter as defined in claim 5 wherein said control member comprises a ring mounted for rotation on the exterior of said casing in surrounding relation to said exposure aperture and said engagement member comprises a pin mounted on said ring and extending into said casing through an arcuate slot in a wall thereof underlying said control ring.

7. The shutter of claim 2 wherein said diaphragm blades are mounted adjacent one end for pivotal movement coaxially with one another and each includes at least one diaphragm aperture in its other end.

8. The shutter of claim 7 wherein each of said diaphragm blades includes portions at their other ends adapted to cooperate with a resilient detent member mounted on said casing for engaging and locating said blades in at least said first and second positions.

9. The shutter of claim 8 wherein each of said diaphragm blades includes a cam slot in the region thereof intermediate its ends and said control member includes a pin engaged in said slots for pivoting said diaphragm blades in response to movement of said control member.

10. The shutter of claim 9 wherein said control member is mounted for rotation on the exterior of said casing and each of said cam slots includes an arcuate section having a radius equal to the distance between said pin and the center of rotation of said control member whereby said control member can be rotated without pivoting each of said blades when each said blade is at a predetermined position.

11. A camera shutter comprising a housing means including an exposure aperture in said housing, a shutter blade supported on said housing means in operative relation to said exposure aperture, said shutter blade normally being located in a position covering said aperture and being supported for rotary movement to a position wherein said aperture is uncovered, means for imparting an aperture-uncovering rotation to said shutter blade, means for reversing the direction of rotation of said shutter blade to cause said blade to return to aperture-covering position, the last-named means comprising at least a pair of rebound members each including a blade-engagement portion located in the path of travel of a part of said shutter blade, the blade-engagement portion of the one of said rebound members located closest the aperture-covering position of said blade being displaceable from said path of movement of said blade, means providing a plurality of diaphragm apertures movable into alignment with said exposure aperture, the last-named means comprising a pair of diaphragm elements each including at least one diaphragm aperture, said diaphragm elements being supported for pivotal movement with respect to one another and said exposure aperture on said housing between a plurality of operative positions including at least a first position wherein a diaphragm aperture in one of said elements is in alignment with said exposure aperture and alone comprises the controlling aperture of said shutter and a second position wherein a diaphragm aperture in the other of said elements is in alignment with said exposure aperture and alone comprises the controlling aperture of said shutter, and control means coupled with said one rebound member for displacing said one member out of said path of movement of said shutter blade and being coupled with said diaphragm elements for predeterminedly rotating said elements between at least said first and second positions.

12. The shutter of claim 11 wherein said control means comprises a manually engageable member mounted for rotation on the outside of said housing about the center of said exposure aperture and said one rebound member includes a projecting portion extending from said housing into engagement with said control member.

13. The shutter of claim 11 wherein each of said diaphragm elements comprises a substantially flat blade and said diaphragm blades are pivotally mounted closely adjacent one another in face-to-face overlying relation.

14. The shutter of claim 13 wherein said control means comprises a ring mounted for rotation on the exterior of said housing in surrounding relation to said exposure aperture, each of said diaphragm blades includes a cam slot, and a pin is provided on said control ring projecting into said cam slots in said diaphragm blades for pivoting said blades in response to rotation of said control ring.

References Cited in the file of this patent

UNITED STATES PATENTS

| 1,787,797 | Riddell | Jan. 6, 1931 |
| 2,201,097 | Kingston | May 14, 1940 |
| 2,498,279 | Kaplowitz | Feb. 21, 1950 |
| 2,531,936 | Fairbank et al. | Nov. 28, 1950 |
| 2,537,110 | Wilkinson | Jan. 9, 1951 |
| 2,662,457 | Fairbank | Dec. 15, 1953 |